United States Patent
Zhang et al.

(10) Patent No.: US 8,788,810 B2
(45) Date of Patent: Jul. 22, 2014

(54) TEMPORARY REGISTRATION OF DEVICES

(75) Inventors: Jiang Zhang, La Jolla, CA (US); Alexander Medvinsky, San Diego, CA (US); Paul Moroney, Olivenhain, CA (US); Petr Peterka, San Diego, CA (US)

(73) Assignee: Motorola Mobility LLC, Chicago, IL (US)

( * ) Notice: Subject to any disclaimer, the term of this patent is extended or adjusted under 35 U.S.C. 154(b) by 951 days.

(21) Appl. No.: 12/648,768

(22) Filed: Dec. 29, 2009

(65) Prior Publication Data

US 2011/0161660 A1    Jun. 30, 2011

(51) Int. Cl.
*G06F 11/30*    (2006.01)

(52) U.S. Cl.
USPC ........... 713/156; 713/161; 713/165; 713/169; 713/170; 713/171; 713/173; 713/176; 713/182; 726/2; 726/3; 726/4; 726/5; 726/10; 726/26; 726/28; 726/29; 380/28; 380/44; 380/47; 380/277; 380/278; 380/282

(58) Field of Classification Search
USPC ...................................... 713/156; 380/44, 47
See application file for complete search history.

(56) References Cited

U.S. PATENT DOCUMENTS

| | | | |
|---|---|---|---|
| 6,574,611 B1 * | 6/2003 | Matsuyama et al. | 705/57 |
| 7,103,663 B2 * | 9/2006 | Inoue et al. | 709/225 |
| 7,873,276 B2 * | 1/2011 | Fan et al. | 398/66 |
| 2005/0021786 A1 * | 1/2005 | Kikkawa et al. | 709/229 |
| 2006/0075021 A1 * | 4/2006 | Sugiyama et al. | 709/203 |
| 2006/0105712 A1 | 5/2006 | Glass et al. | |
| 2008/0208871 A1 * | 8/2008 | Ishibashi | 707/10 |
| 2010/0167656 A1 * | 7/2010 | Zhang et al. | 455/66.1 |
| 2010/0169399 A1 * | 7/2010 | Moroney et al. | 708/250 |
| 2010/0309962 A1 * | 12/2010 | Freundlich et al. | 375/219 |
| 2010/0332831 A1 * | 12/2010 | Shon et al. | 713/168 |

FOREIGN PATENT DOCUMENTS

| | | |
|---|---|---|
| EP | 1182843 A2 | 2/2002 |
| EP | 1881664 A1 | 1/2008 |
| WO | 2010077515 A2 | 7/2010 |
| WO | 2010077547 A2 | 7/2010 |

OTHER PUBLICATIONS

PCT Search Report & Written Opinion, Re: Application #PCT/US2010/060932; Jun. 10, 2011.

(Continued)

*Primary Examiner* — Kambiz Zand
*Assistant Examiner* — Jenise Jackson
(74) *Attorney, Agent, or Firm* — Fox Rothschild LLP

(57) ABSTRACT

In a method of temporarily registering a second device with a first device, in which the first device includes a temporary registration mode, the temporary registration mode in the first device is activated, a temporary registration operation in the first device is initiated from the second device, a determination as to whether the second device is authorized to register with the first device is made, and the second device is temporarily registered with the first device in response to a determination that the second device is authorized to register with the first device, in which the temporary registration requires that at least one of the second device and the first device delete information required for the temporary registration following at least one of a determination of a network connection between the first device and the second device and a powering off of at least one of the first device and the second device.

23 Claims, 9 Drawing Sheets

(56) References Cited

OTHER PUBLICATIONS

Anonymous, "Bluetooth Specification Version 3.0 +HS (vol. 2)", Retrieved from internet <http://www.bluetooth.org/Technical/Specifications/adopted.htm>, Part H: Security Specification; Apr. 21, 2009.

Menezes, A. et al, "Handbook of Applied Cryptography Key Establishment Protocols", Handbook of Applied Cryptography, pp. 489-541; Jan. 1, 1997.

* cited by examiner

TEMPORARY REGISTRATION OF DEVICES

RELATED APPLICATIONS

The present application is related to U.S. patent application Ser. No. 12/345,010, entitled "Personal Identification Number (PIN) Generation between Two Devices in a Network", and filed on Dec. 29, 2008 by Paul Moroney and Jiang Zhang; U.S. patent application Ser. No. 12/344,994, entitled "Method of Targeted Discovery of Devices in a Network", and filed on Dec. 29, 2008 by Jiang Zhang and Petr Peterka; U.S. patent application Ser. No. 12/344,997, entitled "Secure and Efficient Domain Key Distribution for Device Registration", and filed on Dec. 29, 2008 by Jiang Zhang and Sasha Medvinsky; and U.S. patent application Ser. No. 12/345,002, entitled "Multi-Mode Device Registration", and filed on Dec. 29, 2008 by Jiang Zhang and Petr Peterka, the disclosures of which are incorporated by reference in their entireties.

BACKGROUND

The WIRELESS HOME DIGITAL INTERFACE (WHDI) is a wireless standard proposed for a wireless multimedia device network, which can be used at home, in the office or in other short-range wireless network environments. WHDI allows for high bandwidth wireless channels for sending content between devices, which can support uncompressed High Definition (HD) content. For example, a DVD player can be connected to multiple HDTVs wirelessly and send uncompressed content to the HDTVs using WHDI. WHDI eliminates the need for cabling, such as High Definition Multimedia Interface (HDMI) cables, component cables, etc., used to transmit uncompressed content between devices. Conventional wireless technologies such as 802.11, BLUETOOTH, etc., do not have the bandwidth or interface to transmit uncompressed multimedia content between devices.

WHDI devices are characterized as two types. One type is a source device and the other type is a sink device. A WHDI device may be a source device, a sink device, or both depending on its functionality. A source device transmits data streams across a WHDI network to a sink device, and a sink device receives data streams across the WHDI network from the source device. Examples of source devices are set-top box, Personal Computer (PC), notebook PC desktop PC, DVD player, MP3 player, video camcorder, audio/video receiver, gaming console, etc. Examples of sink device are TVs, PCs, projectors, etc.

Currently, WHDI specifies three registration modes (Device-only Mode, Source-Domain Mode, and Sink-Domain Mode). Typically, the sink device has a user interface for the user to manage the registration, such as to select which source device is to be registered with the sink device, and as such, the three registration modes are designed to always initiate from the sink device. However, in cases where the sink device is a projector mounted on the ceiling or a wall of a room, for instance, the sink device may not be readily accessible. In other environments, such as in conference rooms, remote controls for the sink devices may not be available. In addition, security and use by multiple different devices at different times may be of greater concern in the conference room environment than in the home. The current WHDI registration protocol may thus be inadequate to meet all of the requirements for registration in relatively public places, such as, conference rooms.

SUMMARY

Disclosed herein is a method of temporarily registering a second device with a first device, wherein the first device includes a temporary registration mode. In the method, the temporary registration mode in the first device is activated. In addition, a temporary registration operation in the first device is initiated from the second device and a determination as to whether the second device is authorized to register with the first device is made. Moreover, the second device is temporarily registered with the first device in response to a determination that the second device is authorized to register with the first device, wherein the temporary registration requires that at least one of the second device and the first device delete information required for the temporary registration following at least one of a termination of a network connection between the first device and the second device and a powering off of at least one of the first device and the second device.

Also disclosed herein is a method of temporarily registering a second device with a first device, in which the first device comprises at least one of a projector and a display and the second device comprises an electronic device capable of wirelessly communicating data to the first device. In the method, the first device automatically generates a registration PIN or a sequence of input apparatus presses that maps to the registration PIN at least one of upon emergence from one of a standby and an off state and receipt of a temporary registration request from the second device. In addition, the first device displays the generated registration PIN or the sequence of input apparatus presses on the second device that maps to the registration PIN. In addition, an indication from the second device that the generated registration PIN has been entered is received, a determination as to whether the generated registration PIN is valid is made, and the second device is temporarily registered with the first device in response to a determination that the generated registration PIN is valid, wherein the temporary registration requires that at least one of the second device and the first device delete information required for the temporary registration following at least one of a termination of a network connection between the first device and the second device and a powering off of at least one of the first device and the second device.

Also disclosed herein is a sink device that includes one or more modules configured to activate a temporary registration mode, to receive a request to initiate a temporary registration operation from a source device, to determine whether the source device is authorized to register with the sink device, and to temporarily register the source device with the sink device in response to a determination that the second device is authorized to register with the first device, wherein the temporary registration requires that at least one of the second device and the first device delete information required for the temporary registration following at least one of a termination of a network connection between the first device and the second device and a powering off of at least one of the first device and the second device. The sink device also includes a processor configured to implement the one or more modules.

Further disclosed is a computer readable storage medium on which is embedded one or more computer programs. The one or more computer programs implement a method of temporarily registering a second device with a first device, in which the first device includes a temporary registration mode. The one or more computer programs includes a set of instructions for activating the temporary registration mode in the first device, initiating a temporary registration operation in the first device from the second device, determining whether the second device is authorized to register with the first device, and temporarily registering the second device with the first device in response to a determination that the second device is authorized to register with the first device, in which the temporary registration requires that at least one of the second device and the first device delete information required for the temporary registration following at least one of a termination of a network connection between the first device and the second device and a powering off of at least one of the first device and the second device.

Through implementation of the method and sink device disclosed herein, the sink device may be temporarily registered with a source device without requiring that a user access the sink device to initiate the registration, by, for instance, enabling the registration to be initiated at the source device. A user may thus initiate the registration without having to manually access the sink device, which may be positioned in a location that is relatively difficult to access, such as a ceiling of a room. In addition, the method and sink device provide various measures for preventing unauthorized registration and use of the sink device, such as, the requirement that the sink device and the source device delete information, such as a registration key, required for temporary registration after a network connection between the sink device and the source device is terminated or after one or both of the first device and the second device have been powered off.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Figure 1:
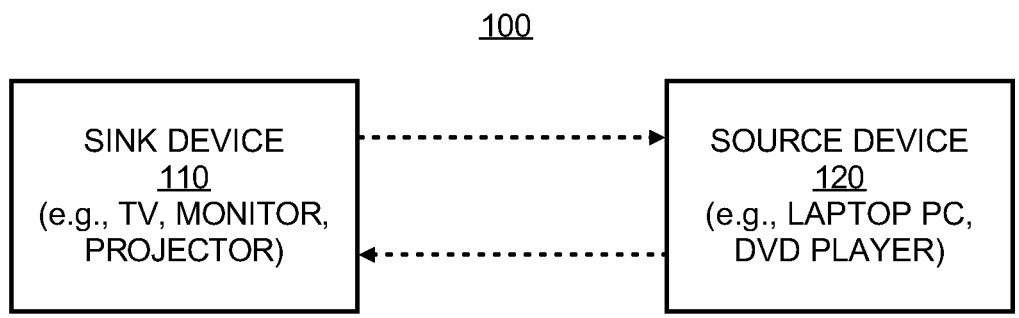
FIG. 1 illustrates a simplified block diagram of a network, according to an embodiment of the present invention.

FIG. 1 illustrates a simplified block diagram of a network 100 according to an embodiment of the present invention. The network 100 of FIG. 1 shows a sink device 110 and a source device 120. The network 100 may be a wireless network, for instance, a WIRELESS HOME DIGITAL INTERFACE (WHDI) network, 802.11, BLUETOOTH, etc. By way of example, the sink device 110 comprises an image or video projector, a television, etc., and the source device 120 comprises an electronic device, such as, a personal computer, a laptop computer, a digital video disk player, a compact disk player, a cellular telephone, a personal digital assistant, a set-top box, a digital video recorder, a personal media player, etc.

Generally speaking, when the source device 120 is registered with the sink device 110, the source device 120 is configured to communicate content in the form of data signals to the sink device 110 to be outputted through the sink device 110. More particularly, for instance, the data signals may comprise video and/or audio signals to be outputted through a display and/or speakers of the sink device 110. As a particular example, the sink device 110 comprises a projector mounted on a ceiling of a room and the source device 120 comprises a laptop computer and a user implements these devices to cause information from the laptop computer to be displayed by the projector.

In order to prevent unauthorized access and use of the projector, as well as the unauthorized interception of the signals communicated between the source device 120 and the sink device 110, and according to an embodiment of the invention, the sink device 110 and the source device 120 implement a temporary registration operation with respect to each other prior to enabling such communications. The temporary registration mode comprises an additional registration mode to the current WHDI registration modes (Device-Only Mode, Source-Domain Mode and Sink-Domain Mode). The current WHDI registration modes are discussed in the related applications recited above.

According to one embodiment, the sink device 110 is placed into a temporary registration mode and the source device 120 initiates the registration operation. According to another embodiment, the sink device 110 is placed in the temporary registration mode and initiates the registration operation automatically upon emergence from an off or a standby state. In both of these embodiments, and in contrast with conventional registration operations, the registration operation need not be manually initiated by a user at the sink device 110. In one regard, therefore, the registration operation may readily be performed even in instances where the sink device 110 may not be easily accessed by a user, such as when the sink device 110 is mounted on the ceiling of a room or is otherwise inaccessible.

In the temporary registration mode, the sink device 110 is configured to temporarily register the source device 120, such that, either or both of the sink device 110 and the source device 120 are required to delete information, such as registration keys, for the temporary registration following termination of a network connection between the sink device 110 and the source device 120 or after one or both of the sink device 110 and the source device 120 have been powered off. As such, the source device 120 is required to go through another registration operation to become temporarily registered with the sink device 110 following termination of the network connection or following powering off of one or both of the sink device 110 and the source device 120. More particularly, for instance, the sink device 110 and the source device 120 are required to go through a registration process, which includes certificate and registration PIN verification and registration key exchange, however, the exchanged registration key is not saved and reused for a next association. In this regard, unauthorized access and use of the sink device 110 by the source device 120 may substantially be limited following termination of a network connection between the sink device 110 and the source device 120 or following powering off of one or both of the sink device 110 and the source device 120. In addition, the sink device 110 may further limit unauthorized access to and use of the sink device 110 by preventing registration with another source device 120 from occurring once the sink device 110 is temporarily registered with a source device 120. Various manners in which the source device 120 may be temporarily registered with the sink device 110 are discussed in greater detail herein below.

Although FIG. 1 depicts a single sink device 110 and a single source device 120, it should be apparent to one of ordinary skill in the art that the network 100 may include additional sink devices and/or additional source devices. An example of a network 200 containing multiple sink devices 112, 114 and multiple source devices 120-124 is shown in FIG. 2.

As shown therein, one or more of a plurality of source devices 120-124 may be configured to communicate with one or more of the sink devices 112, 114 and/or a repeater 210. In addition, the sink devices 112, 114 are configured to communicate with the repeater 210, which comprises components of a source device and a sink device, and is thus able to both receive and transmit data. In this regard, each of the source devices 120-124 is not required to register with all of the sink devices 112-114, but instead, may register with the repeater 210. In this example, the repeater 210 may be configured to receive data signals from one or more of the source devices 120-124 and to communicate the data signals to the other sink devices 112 and 114. In another example, one of the sink devices 112, 114 may operate in a temporary sink domain registration mode or one of the source devices 120-124 may be operated in a temporary source domain registration mode when there are multiple sink devices 112, 114 and/or source devices 120-124. In any respect, for instance, data signals received from one or more of the source devices 120-124 may be outputted through all of the sink devices 112, 114 through implementation of any of the examples discussed above.

According to a particular example, the repeater 210 receives the data signals from one of the source devices 120-124 at any given time. In this example, the repeater 210 is configured to be temporarily registered with a single source device 120-124 at any given time. In another particular example, the repeater 210 concurrently receives data signals from a plurality of the source devices 120-124.

Figure 2:
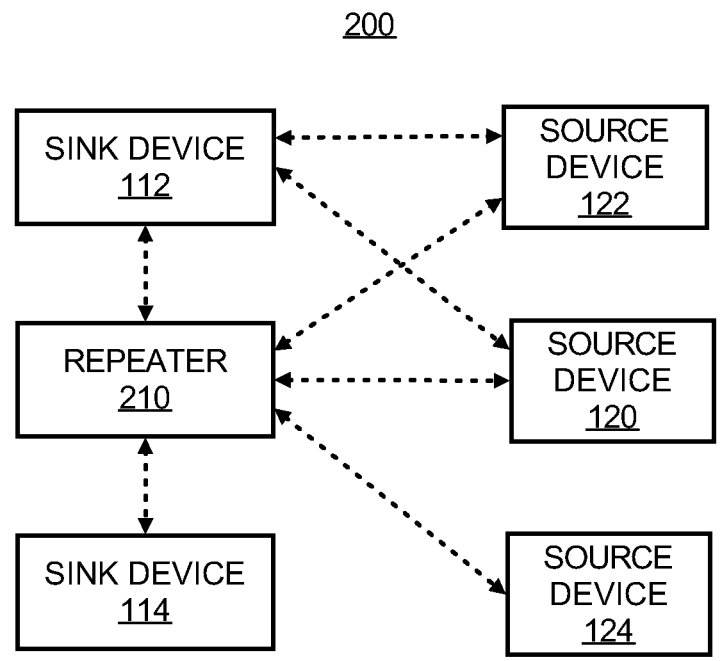
FIG. 2 illustrates a simplified block diagram of a network containing multiple sink devices and source devices, according to an embodiment of the present invention.
Figure 3:
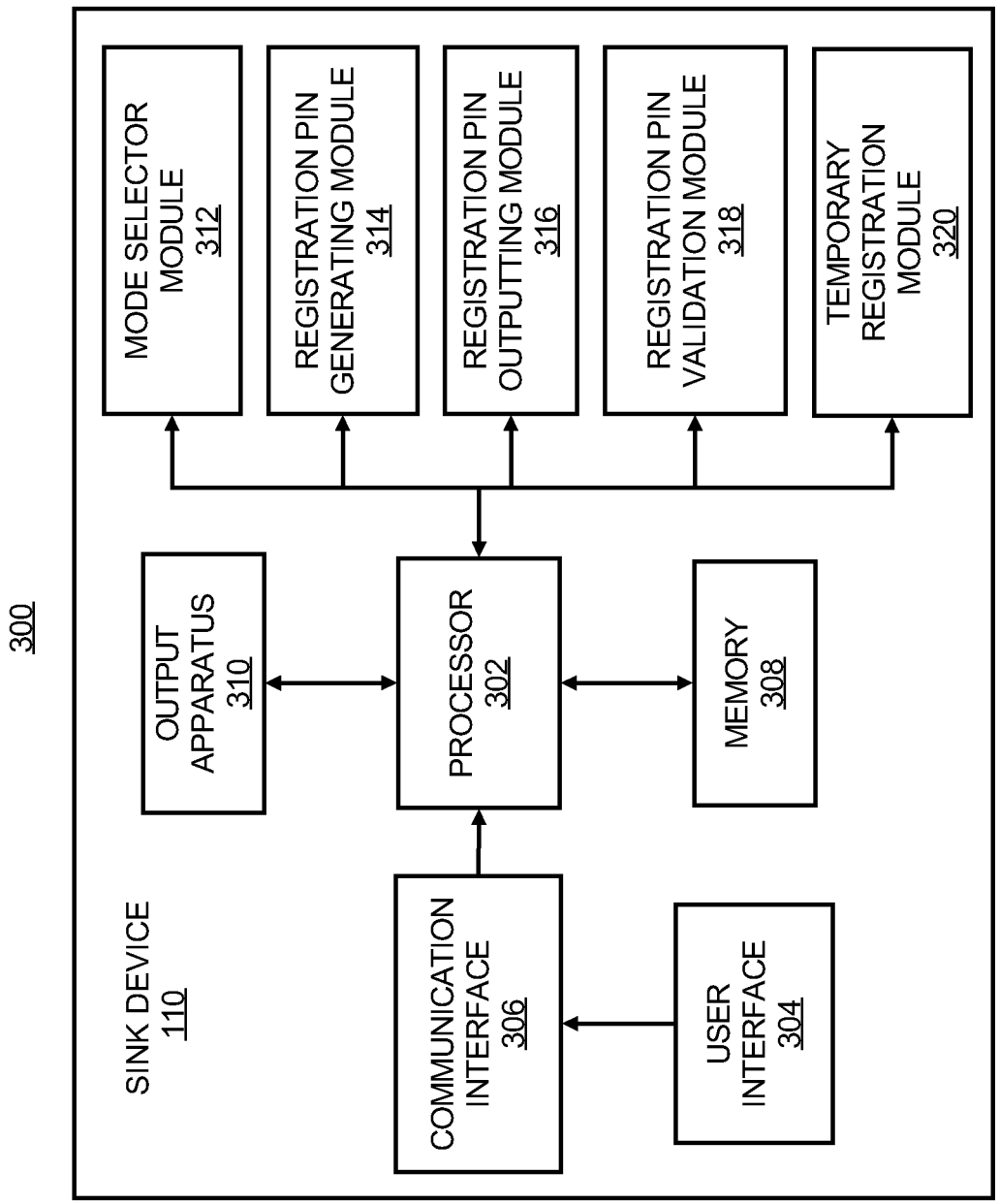
FIG. 3 illustrates a block diagram of a sink device depicted in FIGS. 1 and 2, according to an embodiment of the present invention.

With reference to FIG. 3, there is shown a block diagram 300 of a sink device 110 depicted in FIGS. 1 and 2, according to an embodiment. It should be apparent to those of ordinary skill in the art that the block diagram 300 of the sink device 110 represents a generalized illustration and that other components may be added or existing components may be removed, modified or rearranged without departing from a scope of the sink device 110.

As shown in FIG. 3, the sink device 110 includes a processor 302, a user interface 304, a communication interface module 306, a memory 308, an output apparatus 310, a mode selector module 312, registration personal identification number (PIN) generating module 314, registration PIN outputting module 316, a registration PIN validation module 318, and a temporary registration module 320. The modules 312-320 may comprise software modules, hardware modules, or a combination of software and hardware modules. Thus, in one embodiment, one or more of the modules 312-320 comprise circuit components. In another embodiment, one or more of the modules 312-320 comprise software code stored on a computer readable storage medium, which are executable by the processor 302. In a further embodiment, the modules 312-320 may comprise a combination of hardware and software. In any regard, the functionalities of one or more of the modules 312-320 may be combined into a lesser number of modules 312-320 or separated into additional modules without departing from a scope of the invention.

The user interface 304 may comprise a set of keys, buttons, switches, audio receiver, and the like, on the sink device 110 through which a user may enter inputs into the sink device 110. The communication interface 306 may comprise suitable hardware and/or software to enable wireless communications with the source device 120, the user interface 304, other sink devices 110, etc. The output apparatus 310 may comprise an apparatus configured to output one or more of a visual image and an audible sound, such as, a projector configured to cause an image to be displayed on a surface either on or away from the sink device 110, a screen on the sink device 110 for displaying an image, a speaker, etc.

As discussed in greater detail herein below, the processor 302 is configured to implement or invoke the modules 312-320 to become temporarily registered with the source device 120 when the source device 120 is authorized to do so. In one regard, the processor 302 is configured to cause a registration key to be temporarily stored in random access memory (RAM) (not shown). The processor 302 may also cause other information that enables the temporary registration of the source device 120 in either the RAM or the memory 308, which may comprise a persistent memory. In addition, the processor 302 is configured to delete the registration key for the source device 120 from the RAM or from memory 308 upon termination of a network connection between the sink device 110 and the source device 120.

Various manners in which the components of the sink device 110 may be implemented are described in greater detail with respect to FIGS. 4-10, which depict respective flow diagrams of methods 400 and 800 and protocol diagrams 500-700, 900, and 1000 for temporarily registering a source device 120 with a sink device 110, according to embodiments of the invention. It should be apparent to those of ordinary skill in the art that the methods 400 and 800 and the protocol diagrams 500-700, 900, and 1000 represent generalized illustrations and that other steps may be added or existing steps may be removed, modified or rearranged without departing from scopes of the methods 400 and 800 and the protocol diagrams 500-700, 900, and 1000.

The descriptions of the methods 400 and 800 and the protocol diagrams 500-700, 900, and 1000 are made with particular reference to the sink device 110 and the source device 120 depicted in FIGS. 1-3 and thus make particular reference to the elements contained in the sink device 110 and the source device 120. It should however, be understood that the methods 400 and 800 and the protocol diagrams 500-700, 900, and 1000 may be implemented in apparatuses that differ from the sink device 110 and the source device 120 without departing from scopes of the methods 400 and 800 and the protocol diagrams 500-700, 900, and 1000.

Figure 4:
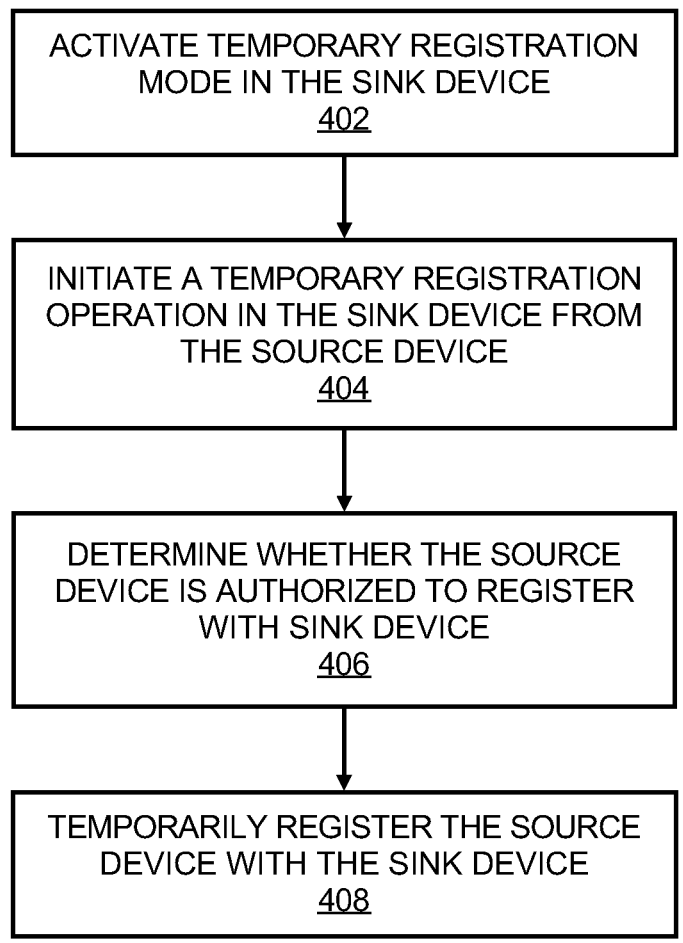
FIGS. 4 and 8, respectively, illustrate flow diagrams of methods for temporarily registering a second device with a first device, according to two embodiments of the present invention.

With reference first to FIG. 4, at step 402, the sink device 120 is placed in the temporary registration mode. Thus, for instance, a user implements the user interface 304 to cause the mode selector module 312 to activate the temporary registration mode. When in the temporary registration mode, the sink device 110 is configured to enable a source device 120 to become temporarily registered with the sink device 110. According to an embodiment, other permanent registration modes of the sink device 110 are disabled to prevent the sink device 110 from being registered permanently with the source device 120 or other source devices when in the temporary registration mode.

At step 404, a temporary registration operation is initiated in the sink device 110 from a source device 120. More particularly, for instance, the sink device 110 receives a registration request from the source device 120 through the communication interface 306. A user may thus initiate the process of registering the source device 120 with the sink device 110 by causing the source device 120 to submit the registration request to the sink device 110. During receipt of the registration request, the sink device 110 may be in a listening state, which the sink device 110 may enter when the sink device 110 is activated and is not registered with another source device. In this regard, the user is not required to access the sink device 110 to initiate the registration process.

Figure 5:
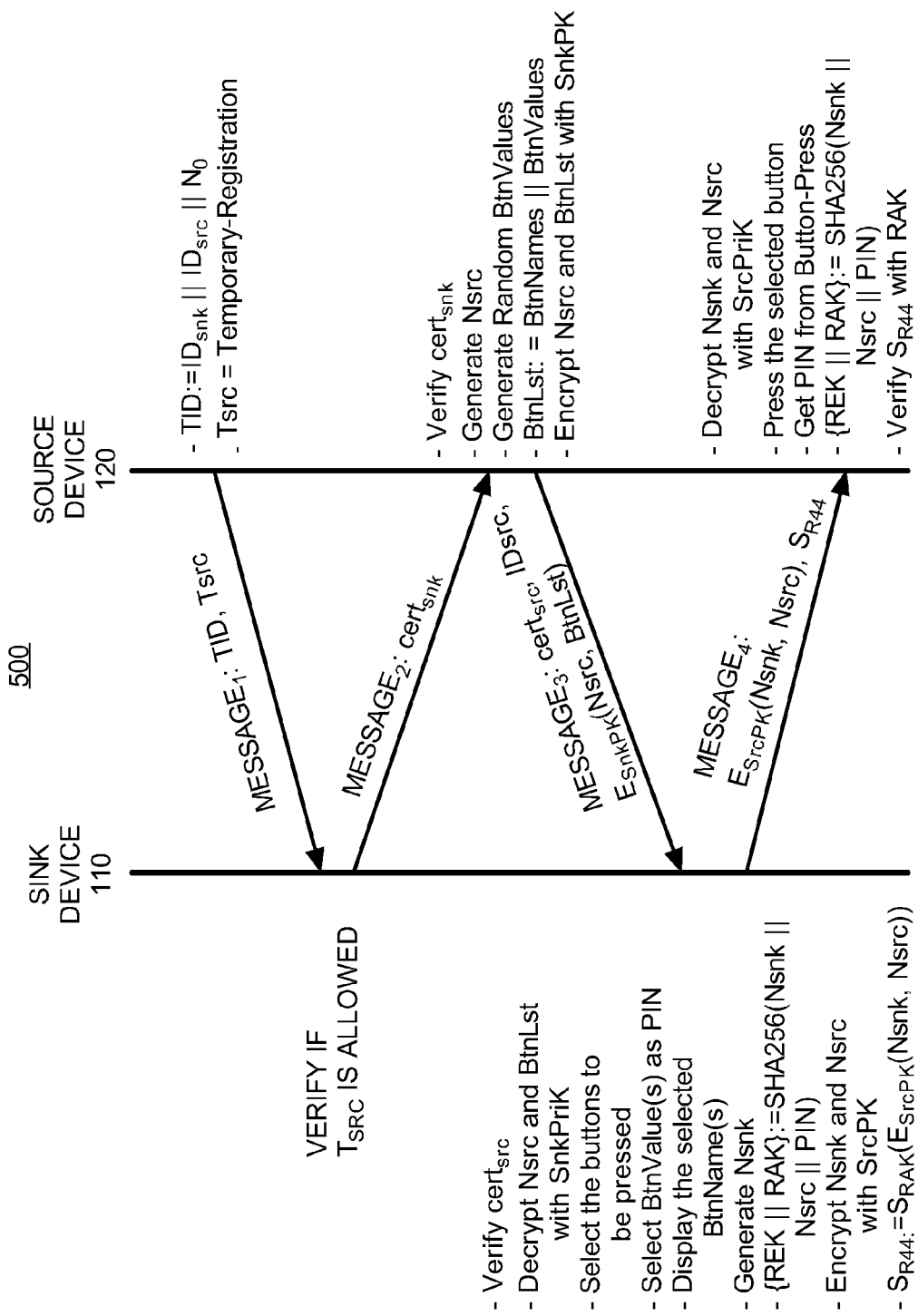
FIGS. 5-7, 9, and 10, respectively, illustrate protocol diagrams that depict operations performed in a sink device and a source device during temporary registration operations, according to embodiments of the invention.

Turning now to FIG. 5, there is shown a protocol diagram 500 that depicts the operations performed in the sink device 110 and the source device 120 in greater detail in temporarily registering the sink device 110 with the source device 120, according to an embodiment of the invention. Thus, starting from the top of the diagram, at step 404, the source device 120 initiates the temporary registration operation. In doing so, the source device 120 is configured to obtain the sink device's 110 identification. The source device 120 may obtain the sink device's 110 identification through any of a number of different manners. For instance, the sink device 110 may display its identification so that a user may input the identification into the source device 120 while initiating the temporary registration request. As another example, a discovery mechanism may be implemented, in which, the source device 120 is configured to query the identifications of nearby sink devices 110 and in which the sink devices 110 respond with their identifications, which a user may input into the source device 120.

The source device is also configured to generate a random number ($N_0$), such as a 2-byte random number, and to compose a transaction identification (TID). In this embodiment, the source device 120 is configured to communicate the random number ($N_0$) and the TID to the sink device 110 in the registration request message (Message$_1$) sent to the sink device 110.

At step 406 (FIG. 4), a determination as to whether the source device 120 is authorized to register with the sink device 110 is made. In making this determination, the sink device 110 may check its registration configuration setting to ensure that it is in the temporary registration mode. In response to a determination that the sink device 110 is in the temporary registration mode, the sink device 110 communicates the sink device 110 certificate (cert$_{snk}$) to the source device 120 and a second message (message$_2$) (FIG. 5).

In addition, the source device 120 receives the second message from the sink device 110 and determines whether the certificate (cert$_{snk}$) of the sink device 110 is authentic using, for instance, a device root CA Public Key. In addition, the source device 120 obtains the sink device's 110 public-key (SnkPK). The source device 120 also verifies whether the sink device 110 identification matches the Device ID in the certificate and the sink device's 110 Device ID. In the event that any of these verifications fails, the temporary registration operation is canceled.

However, if the verifications are determined to be valid, the source device 120 generates a random number (Nsrc), such as a 16-byte random number, and a random number for each button in a button name list (BtnLst) of the source device 120. In addition, the source device 120 RSA encrypts the random number (Nsrc) and the button name list (BtnLst) including the button names and the random values for each button with the sink device's 110 public key (SnkPK). Moreover, the source device 120 communicates a message (message$_3$) containing the certificate of the source device 120, a source device 120 identification, and the encrypted random number and button name list.

In response, the sink device 110 determines whether the certificate (cert$_{src}$) of the source device 110 is authentic using, for instance, a Device Root CA Public Key. In addition, the sink device 110 obtains the source device's 120 public-key (SrcPK). The sink device 110 also verifies whether the source device 120 identification matches the Device ID in the certificate and the source device's 120 Device ID in the header of the message (message$_3$). In the event that any of these verifications fails, the temporary registration operation is canceled.

However, if the verifications are determined to be valid, the sink device 110 decrypts the random number (Nsrc) and the button list (BtnLst) using the sink device's private key (SnkPriK). In addition, the sink device 110 randomly selects one or more buttons in an order of being pressed from the button list, displays their names to the user and uses the corresponding button value or concatenation of the button values in the order of being pressed as a registration personal identification number (PIN). Moreover, the sink device 110 generates a random number (Nsnk), such as a 16-byte random number, and derives the Registration Encryption Key (REK) and Registration Authentication Key (RAK). By way of particular example, the sink device 110 derives the REK and RAK using the following method:

{REK||RAK}=SHA-256(Nsnk||Nsrc||PIN).

REK is the most significant 16 bytes of the 32 bytes SHA-256 result;

RAK is the least significant 16 bytes of the 32 bytes SHA-256 result.

Moreover, the sink device 110 RSA encrypts the random numbers (Nsnk) and (Nsrc) using the source device's public key (SrcPK).

The sink device 110 uses the RAK to generate a message authentication code ($S_{R44}$), such as, a 128-bit AES-CMAC, over the RSA encrypted random numbers (Nsnk) and (Nsrc). In addition, the sink device 110 sends a message (message$_4$) containing the encrypted random numbers (Nsnk) and (Nsrc) and the message authentication code ($S_{R44}$) to the source device 120.

The source device 120 receives the message (message$_4$) and decrypts the random numbers (Nsnk) and (Nsrc) using the source device's private key (SrcPriK) and verifies whether the random number (Nsrc) generated by the source device 120 matches the one transmitted in the third message (message$_3$). If these numbers do not match, the source device 120 terminates the temporary registration operation.

The source device 120 also waits for the user to press the buttons in the order displayed by the sink device 110 before timing out. In addition, the source device 120 generates the PIN based on the buttons pressed by the user. In addition, the source device 120 derives the Registration Encryption Key (REK) and the Registration Authentication Key (RAK) using the same method discussed just above with respect to the sink device 110. Moreover, the source device 120 uses the RAK to verify the message authentication code (AES-CMAC). If the verification fails, the source device 120 disconnects the link and the temporary registration operation is canceled. Otherwise, as indicated at step 408 (FIG. 4), the source device 120 becomes temporarily registered with the sink device 110.

In the temporary registration mode, both the source device 120 and the sink device 110 temporarily store the REK and the RAK. As such, neither the source device 120 nor the sink device 110 persistently saves the REK and the RAK. Accordingly, once the temporary registration has been terminated, for instance, following termination of a network connection between the sink device 110 and the source device 120 or following a powering off of at least one of the sink device 110 and the source device 120, the sink device 110 and the source device 120 are required to delete the exchanged registration key stored in RAM. As such, the sink device 110 and the source device 120 are required to perform the temporary registration process of FIG. 4 in order to become temporarily registered again.

In addition, during the time that the source device 120 is temporarily registered with the sink device 110, a connection between these devices is established and content from the source device 120 may be communicated to the sink device 110. Thus, for instance, the source device 120 may direct the sink device 110 to display content in the form of images, audio, and/or videos. In addition, the processor 302 is configured to prevent another source device, such as the source devices 122 and 124 depicted in FIG. 2, from registering with the sink device 110 while the connection with the source device 120 is maintained.

When there are more than one sink devices 110-114, for instance, as discussed above with respect to FIG. 2, each of the sink devices 110-114 may display content from a registered source device 120. In one embodiment, the sink device 110 comprises a repeater configured to receive content from a registered source device 120 and to communicate the received content to one or more other sink devices 110. In this embodiment, therefore, the source device 120 need only register with a single sink device 110, while enabling the content to be outputted through multiple sink devices 110-114.

Alternatively, however, the source device 120 may register individually with each of the multiple sink devices 110-114.

As a further alternative, for instance, where a repeater is not available, one of the sink devices 110-114 or the source device 120 may operate in a temporary domain registration mode to create a temporary domain to which all of the sink devices 110-114 may temporarily register with the source device 120. A protocol diagram 600 of a temporary source domain mode is depicted in FIG. 6 and a protocol diagram 700 of a temporary sink domain registration mode is depicted in FIG. 7, according to embodiments of the invention.

Figure 6:
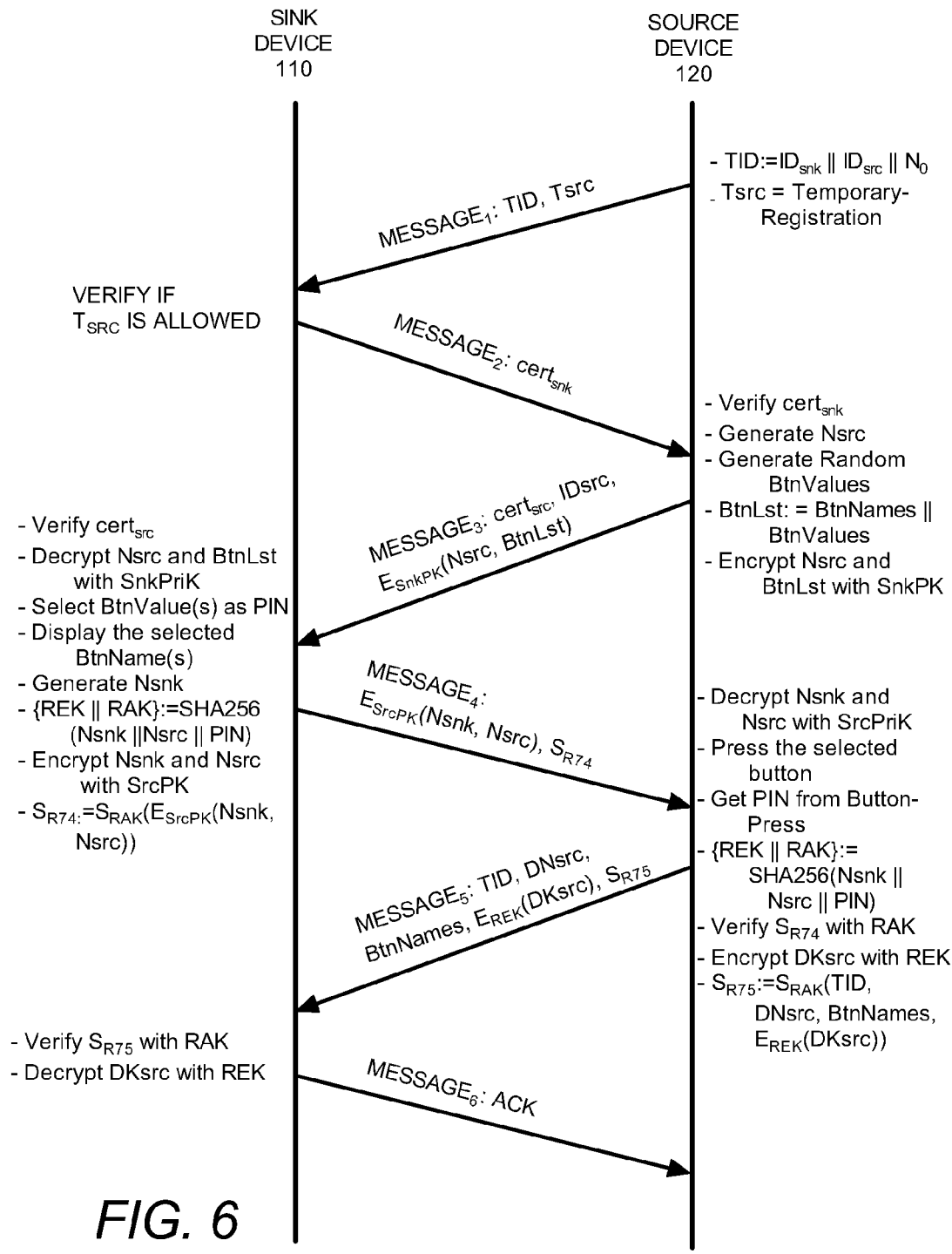

With reference first to FIG. 6, the protocol diagram 600 includes all of the same steps as discussed above with respect to FIG. 5 and includes a couple of additional steps. More particularly, following receipt of the fourth message (message$_4$), the source device 120, in addition to the first four steps discussed above with respect to FIG. 5, RSA encrypts a source domain key (DKsrc) using the REK. In addition, the source device 120 uses the RAK to generate a message authentication code ($S_{R75}$), such as, a 128-bit AES-CMAC, over the RSA encrypted source domain key (DKsrc). In addition, the source device 120 sends a message (message$_5$) containing the TID, source domain name (DNsrc), BtnNames, encrypted source domain key ($E_{REK}$(DKsrc)) and the message authentication code ($S_{R75}$) to the sink device 110.

In response, the sink device 110 determines whether the message authentication code ($S_{R75}$) is authentic using the RAK. In addition, in response to a determination that the message authentication code ($S_{R75}$) is authentic, the sink device 110 decrypts the source domain key (DKsrc) using the REK. Moreover, the sink device 110 sends an acknowledgement (ACK) message to the source device. If, however, the sink device 110 determines that the message authentication code ($S_{R75}$) is not authentic, the sink device 110 terminates the temporary domain registration operation. In addition, once multiple sink devices 110 receive the same temporary domain key, and if a new source device 120 intends to send content to all of the sink devices 110, the new source device 120 only needs to register once with any of the sink devices 110 in the domain.

Figure 7:
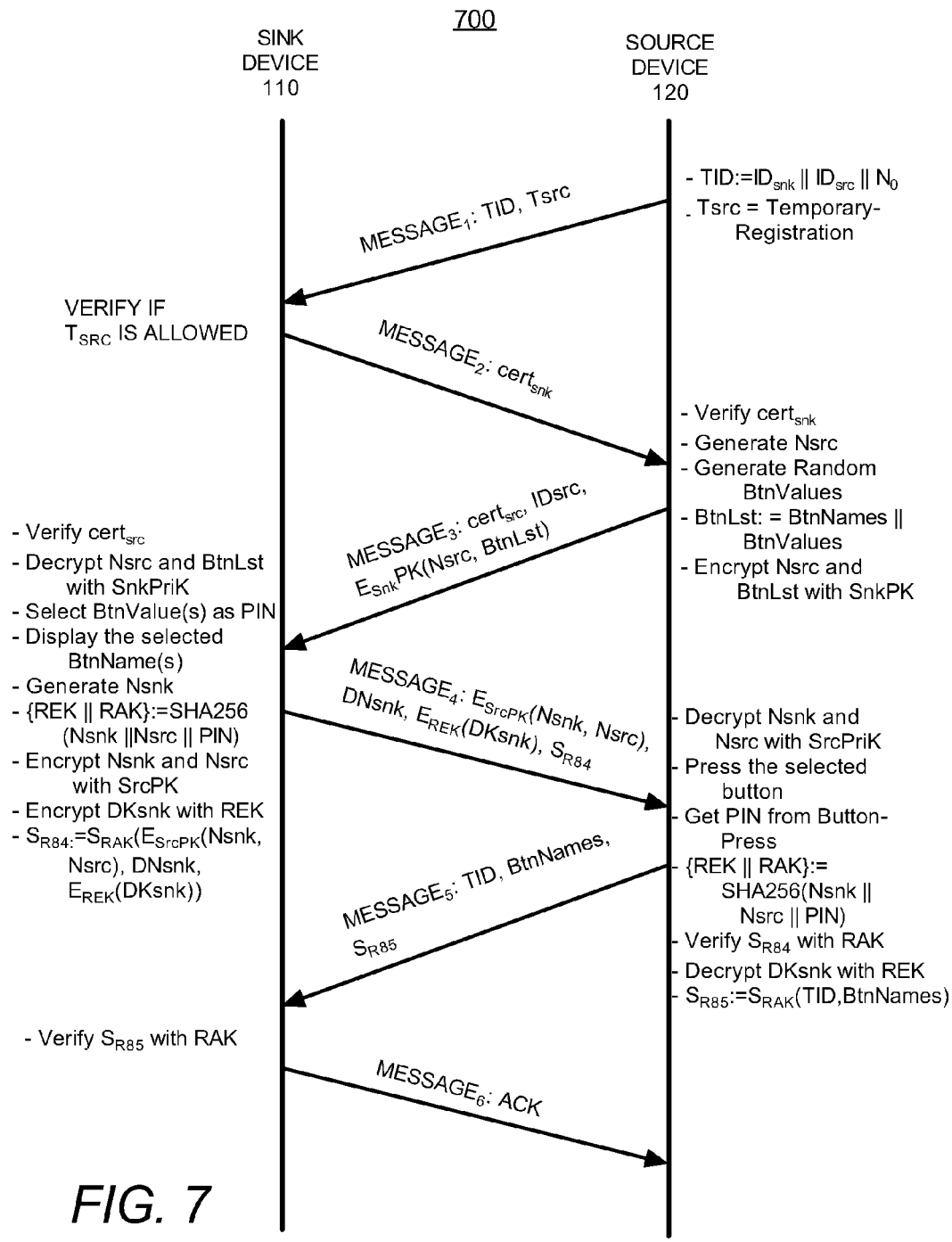

With reference now to FIG. 7, the protocol diagram 700 includes all of the same steps as discussed above with respect to FIG. 5 and includes a couple of additional steps. More particularly, following receipt of the third message (message$_3$), in addition to the first seven bullet points describing the operations performed at the sink device 110 discussed above with respect to FIG. 5, the sink device 110 encrypts a sink domain key (DKsnk) using the REK. In addition, the sink device 110 uses the RAK to generate a message authentication code ($S_{R84}$), such as, a 128-bit AES-CMAC, over the RSA encrypted random numbers (Nsnk) and (Nsrc), the sink domain name (DNsnk) and the encrypted sink domain key (DKsnk). In addition, the sink device 110 sends a message (message$_4$) containing the encrypted random numbers (Nsnk) and (Nsrc), the sink domain name (DNsnk), the encrypted sink domain key (DKsnk), and the message authentication code ($S_{R85}$) to the source device 120.

In response, the source device 120, in addition to the first four steps discussed above with respect to FIG. 5, determines whether the message authentication code ($S_{R84}$) is authentic using the RAK. In addition, the source device 120 decrypts the sink domain key (DKsnk) using the REK. Moreover, the source device 120 uses the RAK to generate a message authentication code ($S_{R85}$), such as, a 128-bit AES-CMAC, over the TID and the BtnNames and sends the TID, BtnNames, and message authentication code ($S_{R85}$) to the sink device 110. In response, the sink device 110, determines whether the message authentication code ($S_{R85}$) is authentic using the RAK. In addition, in response to a determination that the message authentication code ($S_{R85}$) is authentic, the sink device 110 sends an acknowledgement (ACK) message to the source device 120. Otherwise, the sink device 110 terminates the temporary domain registration operation.

Figure 8:
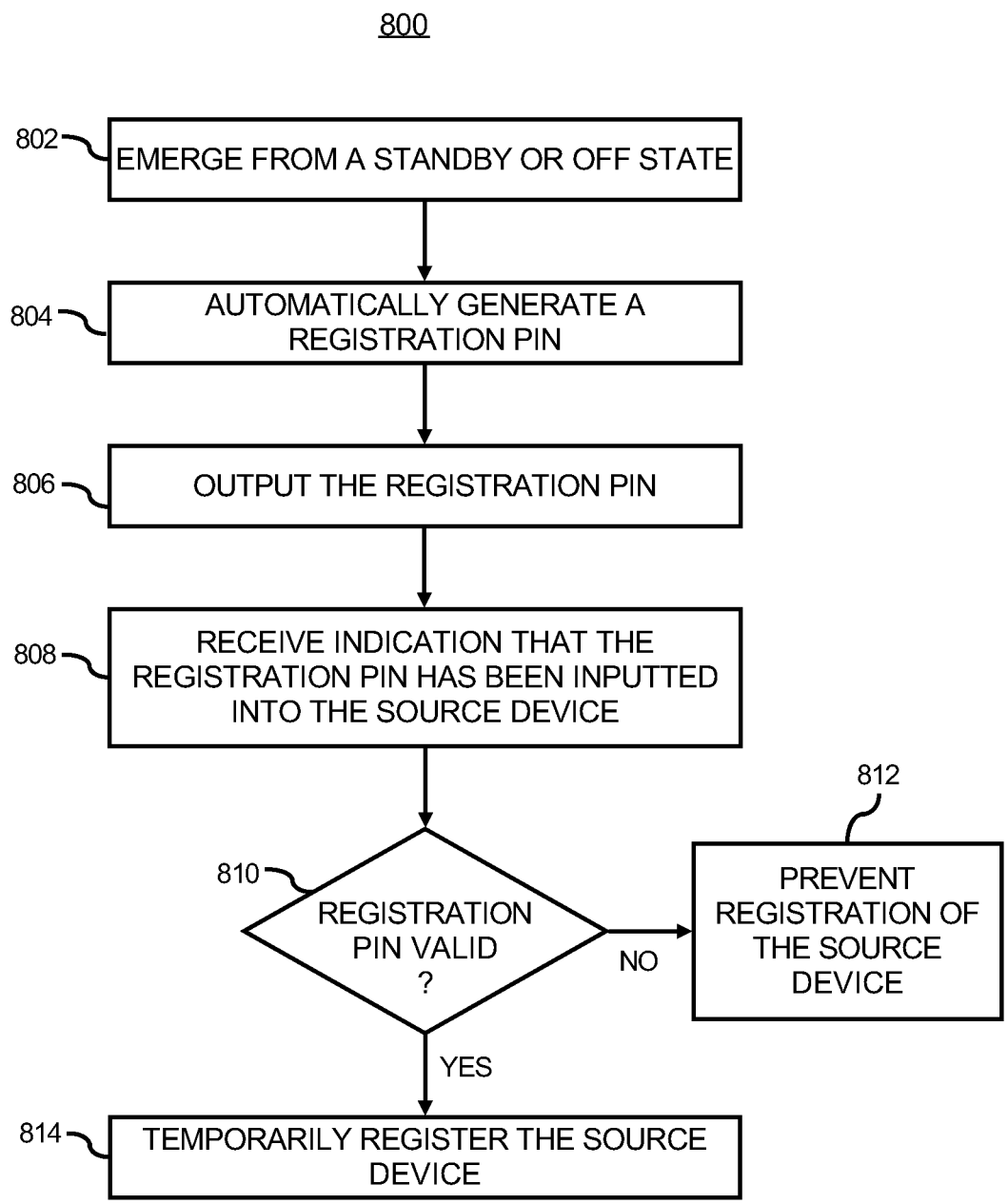

Turning now to FIG. 8, there is shown a method 800 for temporarily registering a source device 120 with a sink device 110, according to another embodiment. As shown therein, at step 802, the sink device 110 emerges from a standby or an off state, for instance, in response to receipt of an activation command, after a predetermined period of time, following a predetermined schedule, etc. In this embodiment, the sink device 110 is configured to be in a temporary registration mode when it emerges from the standby or off state.

At step 804, a registration PIN is automatically generated randomly or based on the received button list, for instance, as discussed above with respect to step 406 in FIG. 4. In addition, at step 806, the sink device 110 visually or audibly outputs the registration PIN. According to an embodiment, the sink device 110 outputs the registration PIN to those users who can access the sink device 110, such as, attendees sitting in a conference room in which the sink device 110 is located. As such, unauthorized parties, such as attackers outside of the conference room are substantially prevented from getting the registration PIN and thus completing the temporary registration.

Figure 9:
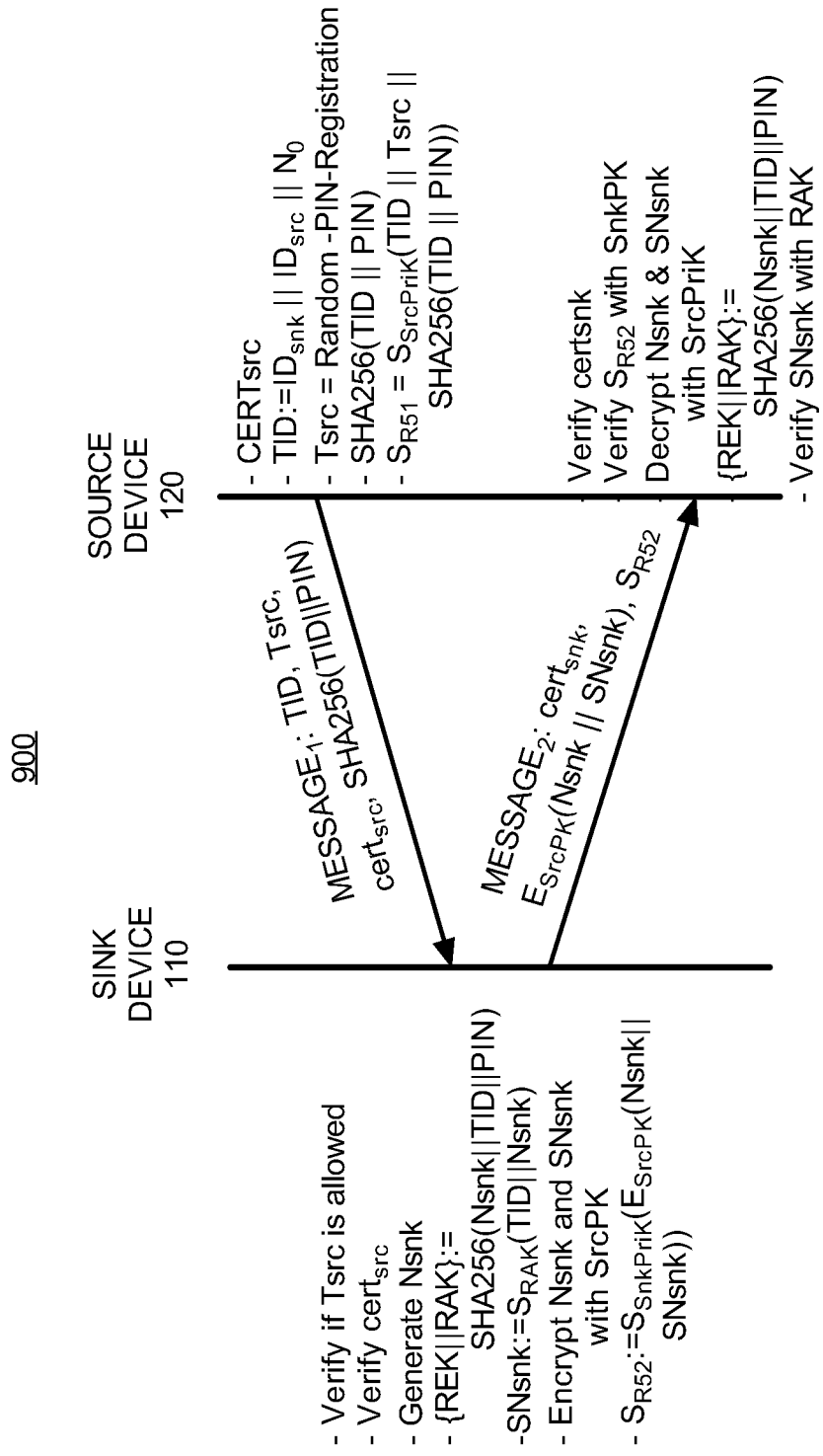

Turning now to FIG. 9, there is shown a protocol diagram 900 that depicts the operations performed in the sink device 110 and the source device 120 in greater detail, according to an embodiment of the invention. The protocol diagram 900, more particularly, depicts a temporary registration operation that includes the use of certificates. Initially, the diagram 900 depicts an instance following user input of the PIN into the source device 120.

Starting from the top of the diagram 900, the source device 120 initiates the temporary registration operation by generating a random number ($N_0$), such as a 2-byte random number, and by composing a transaction identification (TID=IDsnk||IDsrc||$N_0$). The source device 120 also generates a SHA256 hash over the concatenation of the TID and the PIN. In addition, the source device 120 generates a signature over the transaction identification (TID), the transaction type (Tsrc), and the SHA256 hash value (SHA256(TID||PIN)) using the private key corresponding to the device certificate, such as its WHDI certificate. In addition, the source device 120 is communicates a message (message$_1$) containing the source device certificate, the TID, the SHA 256 hash and the RSA signature to the sink device 110.

In response, the sink device 110 verifies that its registration setting is set to the temporary registration mode (step 808, FIG. 8). If the sink device 110 is not in the temporary registration mode, the sink device 110 terminates the temporary registration operation (step 812, FIG. 8). Otherwise, the sink device 110 generates the SHA256 hash over the concatenation of the TID and the current PIN being displayed. If the SHA256 generated by the sink device 110 does not match the received SHA256 hash, the sink device 110 terminates the temporary registration operation. In one regard, this step is to block source devices outside of a room containing the sink device 110 from unauthorized registration with the sink device 110.

If there is a match, the sink device 110 verifies the source device's certificate using, for instance, the Root Device CA Public Key, and getting the source device's public key and identification. In addition, the sink device 110 verifies the source device's identification in the certificate by determining whether the identification matches the source device identification in the TID and the MAC ID in a header of the message. Moreover, the sink device 110 generates a random number (Nsnk), such as a 16-byte random number.

The sink device 110 also generates the SHA 256 hash over the concatenation of the random number (Nsnk), the TID and the PIN as the REK and the RAK. By way of particular example, the first 16 bytes of the hash is the REK and the next 16 bytes is the RAK. Moreover, the sink device 110 uses the derived RAK to generate a message authentication code (SNsnk), such as the AES-CMAC, of the concatenation of the TID and the random number (Nsnk). Furthermore, the sink device 110 uses the source device's public key to RSA encrypt the random number (Nsnk) and the message authentication code (SNsnk) and uses the sink device's private key to generate the RSA signature of the RSA encrypted random number (Nsnk) and message authentication code (SNsnk). The sink device 110 also sends a message (message$_2$) containing the certificate (cert$_{snk}$) of the sink device 110, the encrypted random number (Nsnk) and message authentication code (SNsnk) and the RSA signature to the source device 120.

In response, the source device 120 verifies the sink device's certificate (cert$_{snk}$) using, for instance, the Root Device CA Public key, and gets the sink device's public key (SnkPK) and ID. The source device 120 also verifies whether the identification of the sink device 110 in the certificate (cert$_{snk}$) matches the source device ID (IDsrc) in the TID and the MAC ID in the message header. The source device 120 further uses the sink device public key (SnkPK) to verify whether the RSA signature over the encrypted data is authentic. Because the data includes the TID, which contains the random number (N$_0$), the source device 120 may determine that the message was sent by the sink device 110 holding the certificate.

The source device 120 further uses the source device's RSA private key to decrypt the RSA encrypted data. Only the source device that holds the source certificate should be able to decrypt RSA encrypted data. In addition, the source device 120 generates the SHA256 hash over the concatenation of the random number (Nsnk), the TID and the PIN as the REK and RAK. According to a particular example, the first 16 bytes of the hash is REK and the next 16 bytes is RAK. The source device 120 further uses the derived RAK to generate the message authentication code, such as the AES-CMAC, of the concatenation of TID and random number (Nsnk) to verify the message authentication code (S$_{Nsnk}$). The source device 120 further determines whether the generated message authentication code matches the message authentication code (S$_{Nsnk}$). If there is a match, the source device 120 determines that the RAK is correct and assumes that the REK is also correct (step 810, FIG. 8). In addition, the source device 120 becomes temporarily registered with the sink device 110 and the temporary registration operation is completed (step 814, FIG. 8). If a match does not exist, however, the temporary registration operation is terminated and the source device 120 does not become registered with the sink device 110 (step 812, FIG. 8).

In addition, at this point both the sink device 110 and the source device 120 should have exchanged the temporary registration key securely. As an option, the temporary registration key may be used as an association key if support of multicast in the temporary registration is not desired. Generally speaking, the Association key is exchanged using the temporary registration key or temporary domain key for each connection. In addition, the association key is generated by the sending device and used for content data encryption and decryption. In a multicast, the source device 120 may use the same association key for all of the connections with the sink devices 110.

Figure 10:
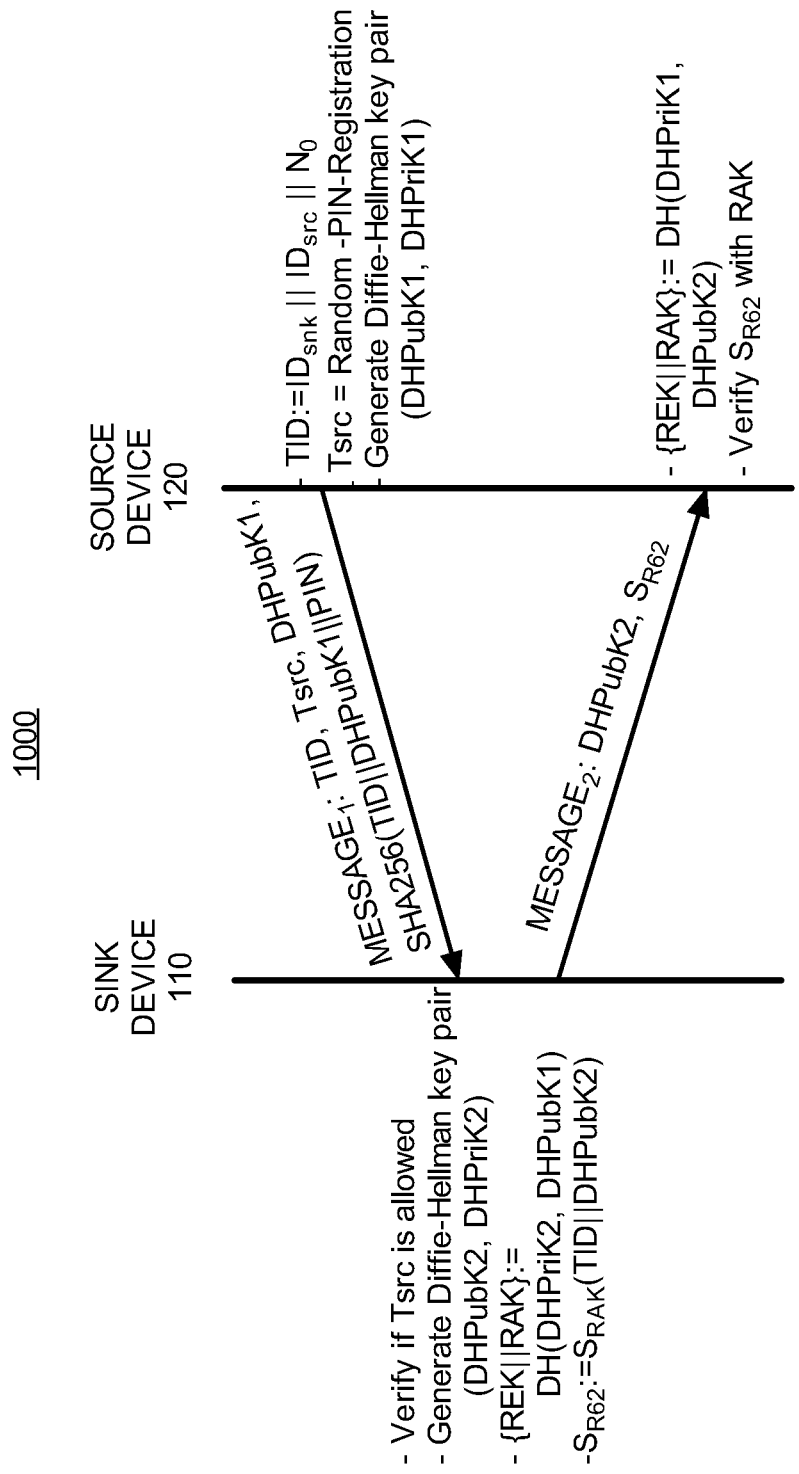

Turning now to FIG. 10, there is shown a protocol diagram 1000 that depicts the operations performed in the sink device 110 and the source device 120 in greater detail, according to another embodiment of the invention. The protocol diagram 1000, more particularly, depicts a temporary registration operation that does not include the use of certificates. Initially, the diagram 1000 depicts an instance following user input of the PIN into the source device 120.

Starting from the top of the diagram 1000, the source device 120 initiates the temporary registration operation by generating a random number (N$_0$), such as a 2-byte random number, and by composing a transaction identification (TID=IDsnk||IDsrc||N$_0$). The IDsnk is the sink's Device ID and IDsrc is the source's Device ID. In addition, the source device 120 generates a Diffie-Hellman public key pair (DHPubK1, DHPriK1) and keeps the private key secure. The source device 120 also generates the SHA256 hash over the concatenation of TID, DHPubK1 and PIN and compose and sends a first message (message$_1$) containing the TID, Tsrc, DHPubK1, and the SHA256 (TID||DHPubK1||PIN) to the sink device 110.

When the sink device 110 receives the message, the sink device 110 verifies if its registration configuration setting allows the temporary registration mode. For instance, the sink device 110 determines whether it is in the temporary registration mode (step 808, FIG. 8). If the sink device 110 is not in the temporary registration mode, the sink device 110 terminates the temporary registration operation (step 812, FIG. 8). Otherwise, the sink device 110 generates the SHA256 hash over the concatenation of TID, DHPubK1 and the current PIN being displayed.

If the SHA256 hash does not match the received SHA256 hash, the sink device 110 drops the message and terminates the temporary registration operation (step 812, FIG. 8). In one regard, this step is to block source devices outside of a room containing the sink device 110 from unauthorized registration with the sink device 110.

If the sink device 110 determines that the generated SHA 256 hash matches the received SHA256 hash, the sink device 110 verifies whether the source device ID (IDsrc) in the TID matches the source MAC ID in the message header. If the source device ID in the TID does not match source MAC ID in the message header, the sink device 110 drops the message and terminates the temporary registration operation (step 812, FIG. 8). Otherwise, the sink device 110 generates a Diffie-Hellman public key pair (DHPubK2, DHPriK2) and uses the private key and the DHPubK1 to generate a shared secret value. In addition, sink device 110 uses the shared secret value to derive the REK and RAK. By way of a particular example, the sink device 110 uses the first 16 bytes of the SHA256 hash of the shared secret value for the REK and next 16 bytes for the RAK.

Moreover, the sink device 110 uses the derived RAK to generate the message authentication code, such as, the AES-CMAC, of the concatenation of TID and DHPubK2. The sink device further composes a message (message$_2$) and sends the message to the source device 120.

After the source device 120 receives the message (message$_2$), the source device 120 uses the source device's Diffie-Hellman private key DHPriK1 and the DHPubK2 to generate the shared secret value. The source device 120 also uses the shared secret value to derive the REK and RAK. By way of example, the source device 120 uses the first 16 bytes of the SHA256 hash of the shared secret value for the REK and next 16 bytes for the RAK. The source device 120 further uses the derived RAK to generate the message authentication code, such as, the AES-CMAC, of the concatenation of TID and DHPubK2 to verify the signature of the sink device 110.

At this point, both the sink device 110 and the source device 120 should have securely exchanged the temporary registration PIN. As an option, the temporary registration PIN may be used as the Association key if support of multicast in the temporary registration is not desired.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Through implementation of the method and sink device disclosed herein, the sink device may be temporarily registered with a source device without requiring that a user access the sink device to initiate the registration, by, for instance, enabling the registration to be initiated at the source device. A user may thus initiate the registration without having to manually access the sink device, which may be positioned in a location that is relatively difficult to access, such as a ceiling of a room. In addition, the method and sink device provide various measures for preventing unauthorized registration and use of the sink device, such as, the requirement that at least one of the sink device and the source device delete their information, such as a registration key, required for temporary registration respectively after a network connection between the sink device and the source device is terminated or after one or both of the first device and the second device have been powered off.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method of temporarily registering a second device with a first device, wherein the first device includes a temporary registration mode, the method comprising:
   activating the temporary registration mode in the first device;
   initiating a temporary registration operation in the first device from the second device;
   determining whether the second device is authorized to register with the first device; and
   temporarily registering the second device with the first device in response to a determination that the second device is authorized to register with the first device;
   following at least one of a termination of a network connection between the first device and the second device and a powering off of at least one of the first device and the second device:
   terminating the temporary registration; and
   at least one of the second device and the first device deleting information required for the temporary registration.

2. The method according to claim 1, further comprising:
   in the second device,
      generating a random number for the second device and a random number for each input apparatus in an input apparatus list;
      encrypting the generated random number for the second device and the input apparatus list including the random number for each input apparatus; and
      sending a message containing the encrypted random number for the second device and the input apparatus list including the random number for each input apparatus to the first device.

3. The method according to claim 2, further comprising:
   in the first device,
      decrypting the encrypted random number of the second device and the input apparatus list including the random number for each input apparatus;
      randomly selecting one or more input apparatuses from the input apparatus list and an order in which the one or more input apparatuses are to be entered, which maps to a registration personal identification number (PIN);
      displaying the input apparatuses in the selected order that is used to map to the registration PIN;
      generating a random number for the first device and deriving a registration encryption key (REK) and a registration authentication key (RAK) using the random number for the first device, the random number for the second device and the registration PIN;
      temporarily storing the REK and the RAK; and
      communicating a message containing the encrypted random number for the first device to the second device.

4. The method according to claim 3, further comprising:
in the second device,
receiving the message containing the encrypted random number for the first device, wherein the message contains a signature;
decrypting the encrypted random number for the first device;
receiving input apparatus presses from a user and mapping them to a PIN;
deriving an REK and an RAK with the decrypted random number for the first device, the random number generated for the second device and the registration PIN;
determining whether the signature of the received message is verified through use of the derived RAK; and
stopping the temporary registration in response to the signature of the message not verifying correctly.

5. The method according to claim 1, wherein activating the temporary registration mode in the first device disables permanent activation modes of the first device to prevent the first device from being registered permanently with the second device or other devices.

6. The method according to claim 1, wherein the first device comprises a repeater configured to be one of temporarily and permanently registered with a plurality of other first devices, said method further comprising:
in the first device,
receiving data from the second device; and
communicating the received data to the plurality of other first devices.

7. The method according to claim 1, further comprising:
creating a temporary domain by operating the second device in a temporary source domain mode operable to enable the second device to be concurrently and temporarily registered with multiple sink devices by registering with only one sink device.

8. The method according to claim 1, further comprising:
creating a temporary domain by operating the first device in a temporary sink domain mode operable to enable the second device to obtain temporary domain information, to thereby enable the second device to be concurrently and temporarily registered with multiple sink devices.

9. The method according to claim 1, wherein the temporary registration requires that at least one of the second device and the first device delete information required for the temporary registration responsive to a powering off of at least one of the first device and the second device.

10. A sink device comprising:
one or more modules configured to activate a temporary registration mode, to receive a request to initiate a temporary registration operation from a source device, to determine whether the source device is authorized to register with the sink device, and to temporarily register the source device with the sink device in response to a determination that the source device is authorized to register with the sink device, wherein the temporary registration requires that, following at least one of a termination of a network connection between the sink device and the source device and a powering off of at least one of the sink device and the source device, at least one of the source device and the sink device terminate the temporary registration and delete information required for temporary registration; and
a processor configured to implement the one or more modules.

11. The sink device according to claim 10, wherein the sink device comprises at least one of an image projector and a display, and wherein the one or more modules are configured to output a registration PIN or a sequence of input apparatus presses that maps to the registration PIN by displaying the registration PIN or the sequence of input apparatus presses through the at least one of the image projector and the display.

12. The sink device according to claim 10, wherein the one or more modules are further configured to receive a message including an encrypted at least one random number and a list of input apparatuses on the source device, to decrypt the encrypted at least one random number and list of input apparatuses on the source device, to randomly select one or more input apparatuses in a specific order from the input apparatus list to be used as a PIN entry in the source device, and to display the randomly selected one or more input apparatuses and the input order for entry into the source device.

13. The sink device according to claim 10, wherein the one or more modules are further configured to, responsive to activation of the temporary registration mode in the first device, disable permanent activation modes of the first device to thus prevent the first device from being registered permanently with the source device or other source devices.

14. The sink device according to claim 10, wherein the sink device comprises a repeater configured to be registered with a plurality of other sink devices, said one or more modules being further configured to receive data from a registered source device and to communicate the received data to the plurality of other sink devices.

15. A method of temporarily registering a second device with a first device, wherein the first device comprises at least one of a projector and a display and the second device comprises an electronic device capable of wirelessly communicating data to the first device, said method comprising:
in the first device,
automatically generating a registration personal identification number (PIN) at least upon one of an emergence from one of a standby and an off state;
displaying the generated registration PIN;
receiving an indication from the second device that the generated registration PIN has been entered;
determining whether the generated registration PIN is valid; and
temporarily registering the second device with the first device in response to a determination that the generated registration PIN is valid; and
following at least one of a termination of a network connection between the first device and the second device and a powering off of at least one of the first device and the second device:
terminating the temporary registration; and
at least one of the second device and the first device deleting information required for the temporary registration.

16. The method according to claim 15, further comprising:
determining whether the first device is registered with another device; and
wherein generating a registration PIN further comprises generating the registration PIN in response to a determination that the first device is not registered with another device.

17. The method according to claim 15, further comprising:
in the second device,
generating a random number;
composing a transaction identification;
obtaining a certificate;
generating a hash over a concatenation of the transaction identification and the entered registration PIN;

generating an RSA signature to verify ownership of the certificate; and communicating a message containing the random number, the certificate, the hash, and the RSA signature to the first device.

18. The method according to claim 17, further comprising:
in the first device,
generating a second hash over the concatenation of the transaction identification and the registration PIN;
determining whether the second hash matches the hash received from the second device;
determining whether the certificate of the second device matches information contained in a header of the message received from the second device;
determining whether the RSA signature of the message is verified using the public key retrieved from the certificate of the second device; and
stopping registration of the second device with the first device in response to at least one of the second hash not matching the hash received from the second device, the certificate not matching the information contained in the message header, and a failure in the verification of the RSA signature of the message.

19. The method according to claim 18, further comprising:
in the first device,
in response to the second hash matching the hash received from the second device and the certificate matching the information contained in the message header, generating a random number;
generating a hash over the concatenation of the random number, the transaction identification, and the registration PIN, and partitioning the hash into a registration encryption key (REK) and a registration authentication key (RAK);
using the RAK to generate a message authentication code of the concatenation of the transaction identification and the random number;
using the second device's public key to encrypt the random number and the message authentication code; and
communicating a message containing the encrypted random number and message authentication code;
in the second device,
verifying a certificate of the first device and obtaining a public key and identification of the first device;
using the public key of the first device to verify a signature over the encrypted random number and message authentication code;
using the private key of the second device to decrypt the encrypted random number and message authentication code;
generating a hash over the concatenation of the random number, transaction identification, and the entered registration PIN and partitioning the hash into the REK and the RAK; and
using the derived RAK to generate a message authentication code of the concatenation of the transaction identification and the random number to verify the message authentication code in the message received from the first device.

20. The method according to claim 15, further comprising:
in the second device,
generating a random number and composing a transaction identification;
generating a Diffie-Hellman public key pair and securing a private key;
generating a hash over the concatenation of the transaction identification, the Diffie-Hellman public key of the second device, and the entered registration PIN; and
communicating a message containing the hash to the first device.

21. The method according to claim 20, further comprising:
in the first device,
generating a second hash over the concatenation of the transaction identification, the Diffie-Hellman public key of the second device, and the registration PIN;
determining whether the second hash matches the hash received from the second device; and
stopping registration of the second device with the first device in response to the second hash not matching the hash received from the second device.

22. The method according to claim 21, further comprising:
in the first device,
in response to the second hash matching the hash received from the second device, generating a Diffie-Hellman public key pair;
using the private key and the received Diffie-Hellman public key to generate a shared secret value;
using the shared secret value to derive a registration encryption key (REK) and a registration authentication key (RAK);
using the derived RAK to generate a message authentication code of the concatenation of the transaction identification and the Diffie-Hellman public key of the first device; and
communicating a message containing the message authentication code to the second device; and
in the second device,
using the second device's private key and the received first device's public key to generate the shared secret value;
using the shared secret value to derive the REK and the RAK; and
using the derived RAK to generate the message authentication code of the concatenation of the transaction identification and the Diffie-Hellman public key of the first device to verify the signature of the first device.

23. A non-transitory computer readable storage medium on which is embedded one or more computer programs, said one or more computer programs implementing a method of temporarily registering a second device with a first device, wherein the first device includes a temporary registration mode, said one or more computer programs comprising a set of instructions for:
activating the temporary registration mode in the first device;
initiating a temporary registration operation in the first device from the second device;
determining whether the second device is authorized to register with the first device; and
temporarily registering the second device with the first device in response to a determination that the second device is authorized to register with the first device, wherein the temporary registration requires that, following at least one of a termination of a network connection between the first device and the second device and a powering off of at least one of the first device and the second device, at least one of the second device and the first device terminate the temporary registration and delete information required for the temporary registration.

* * * * *